United States Patent [19]

Sakai et al.

[11] Patent Number: 4,888,536
[45] Date of Patent: Dec. 19, 1989

[54] DEVICE FOR CONTROLLING POSITIONING OF AN OBJECT

[75] Inventors: Toshikazu Sakai, Kawasaki; Makoto Higomura, Yokohama, both of Japan

[73] Assignee: Canon Kabushiki Kaisha, Tokyo, Japan

[21] Appl. No.: 28,406

[22] Filed: Mar. 20, 1987

[30] Foreign Application Priority Data

Mar. 24, 1986 [JP] Japan .................................. 61-63939

[51] Int. Cl.⁴ .............................................. G05B 11/18
[52] U.S. Cl. .................................... 318/592; 318/590; 318/611
[58] Field of Search ............... 318/561, 590, 592, 594, 318/611

[56] References Cited

U.S. PATENT DOCUMENTS

| 3,555,252 | 1/1971 | Garden | 318/561 X |
|---|---|---|---|
| 3,876,873 | 4/1975 | Slawson | 318/561 X |
| 3,917,930 | 11/1975 | Davey et al. | 318/561 |
| 4,203,064 | 5/1980 | Suzuki et al. | 318/561 X |
| 4,262,239 | 4/1981 | Kawa | 318/561 |
| 4,355,273 | 10/1982 | Duvall | 318/561 |
| 4,450,393 | 5/1984 | Kohzai et al. | 318/592 |
| 4,513,234 | 4/1985 | Nozawa | 318/592 X |
| 4,609,954 | 9/1986 | Bolton et al. | 318/561 X |
| 4,641,071 | 2/1987 | Tazawa et al. | 318/594 X |
| 4,646,635 | 3/1987 | Salazar et al. | 318/561 X |
| 4,710,865 | 12/1987 | Higomura | 318/594 X |

Primary Examiner—Bentsu Ro
Attorney, Agent, or Firm—Fitzpatrick, Cella, Harper & Scinto

[57] ABSTRACT

A device for controlling positioning of a movable object includes a system for storing therein a provisional target position for the movement of the movable object, the storing system being arranged to store therein the provisional target position by providing an offset with respect to a final target position at which the movable object is to be finally positioned, and a control unit for controlling movement of the movable object, the controlling unit being effective to move the movable object so that, at least during a particular section of the movement, the movable object aims at the provisional target position, and the controlling unit being also effective to introduce, at a predetermined timing, the final target position so that the movable object is moved while aiming at the final target position.

8 Claims, 6 Drawing Sheets

DEVICE FOR CONTROLLING POSITIONING OF AN OBJECT

FIELD OF THE INVENTION AND RELATED ART

This invention relates to a device for controlling positioning of an object and, more particularly, to a device for controlling positioning of a movable object which is moved repeatedly. Typically, the device of the present invention is suitably usable in semiconductor device manufacturing apparatus such as step-and-repeat type exposure apparatus or IC (integrated circuit) bonders, industrial robots, NC (numerical control) machine tools, etc., for controlling positioning of a movable object such as a workpiece.

FIG. 1 shows an example of known type positioning control device, typically used in a semiconductor device manufacturing exposure apparatus of the step-and-repeat type. In this control device, the positioning of a movable member 10, which is a semiconductor wafer carrying stage in this case, is effected in accordance with a velocity profile, as illustrated in FIG. 2, with which the movable member is moved.

In the graph of FIG. 2, the moving speed of the movable member 10 is plotted with respect to time. The period from time ta to time td is a speed controlling period during which the movable member 10 is moved with its velocity being controlled. At time td, when the movable member reaches a position near a target position (a desired stop position), the controlling mode is changed to a position controlling mode, wherein the movable member is moved with its position being controlled. In this manner, the movable member is finally positioned. In the graph of FIG. 2, time ta corresponds to an acceleration starting point. Time tb corresponds to an acceleration termination point at which the maximum moving speed is reached so that the movable member is thereafter moved at a constant speed. Time tc corresponds to a deceleration starting point, and time td corresponds to a controlling mode changeover point which is the point of transition from the speed controlling mode to the position controlling mode. The positioning of the movable member is completed at time te.

When, in the structure of FIG. 1, the speed controlling mode is to be established, an analog switch 6 is actuated to select a speed instructing digital-to-analog converter 2 (hereinafter "D/A converter"), such that a speed function generator 1 produces signals corresponding to the velocity profile for the period from time ta to time td in FIG. 2. These signals from the generator 1 are supplied to the D/A converter 2, whereby a varying speed-instructing voltage that corresponds to the velocity profile (ta-td) is generated. An amplifier 7, a motor 8 and a speed detector 9 cooperate with each other to define a closed loop which is effective to control the moving speed of the movable member 10 in the manner of speed feedback control. Thus, the movable member 10 is moved exactly at a varying speed corresponding to the varying speed-instructing voltage supplied from the D/A converter 2. Then, at the controlling mode changeover point td, the control mode is changed to the position controlling mode that is effective to position the object 10 more precisely. For this purpose, the analog switch 6 is actuated to select a positional difference outputting digital-to-analog converter 5 (hereinafter "D/A converter"). The D/A converter 5 is arranged to receive output signals from a positional difference counter 4 which is effective to detect the difference between the target position (desired stop position) and the current position of the movable member 10, the latter being detected by a current position counter 12 with the aid of a position detector 11. Thus, the counter 4 cooperates with the D/A converter 5, the amplifier 7, the motor 8, the movable member 10, the position detector 11 and the current position counter 12 to provide a closed loop which defines a position feedback controlling system.

With the structure of FIG. 1, however, after the position controlling mode is established, the velocity of the movable member 10 (i.e. the position of the movable member 10) fluctuates or vibrates remarkably, as depicted in FIG. 2 by a curve between time td and time te. As a result, a long time is necessary until the vibration of the movable member 10 is sufficiently attenuated in the vicinity of the target position so that the member 10 is well positioned.

SUMMARY OF THE INVENTION

It is accordingly a primary object of the present invention to provide a positioning control device by which the time for positioning can be reduced while retaining the accuracy of positioning.

In accordance with one preferred form of the present invention, to achieve this object, there is provided a device for controlling positioning of a movable member, having a servo-control system which is operable in a first control mode adapted to move the movable member at a relatively higher speed to a position in the neighborhood of a target position and also adapted to decelerate the movement of the movable member to a predetermined final speed. The servo-control system is also operable in a second control mode which is established after the final speed is reached and which is effective to position the movable member with respect to the target position with a relatively high positioning accuracy. In accordance with this preferred form, the history of the past positioning operation is taken into account. More specifically, as regards the target position at which the movable member is to be finally stopped or positioned, the history of the past positioning operation is taken into account and a suitable correction value is determined for the target position. That is, a provisional target position is set and the servo-control system is operated during an initial period of the positioning control operation so as to move the movable member while aiming at the provisional target position thus set.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
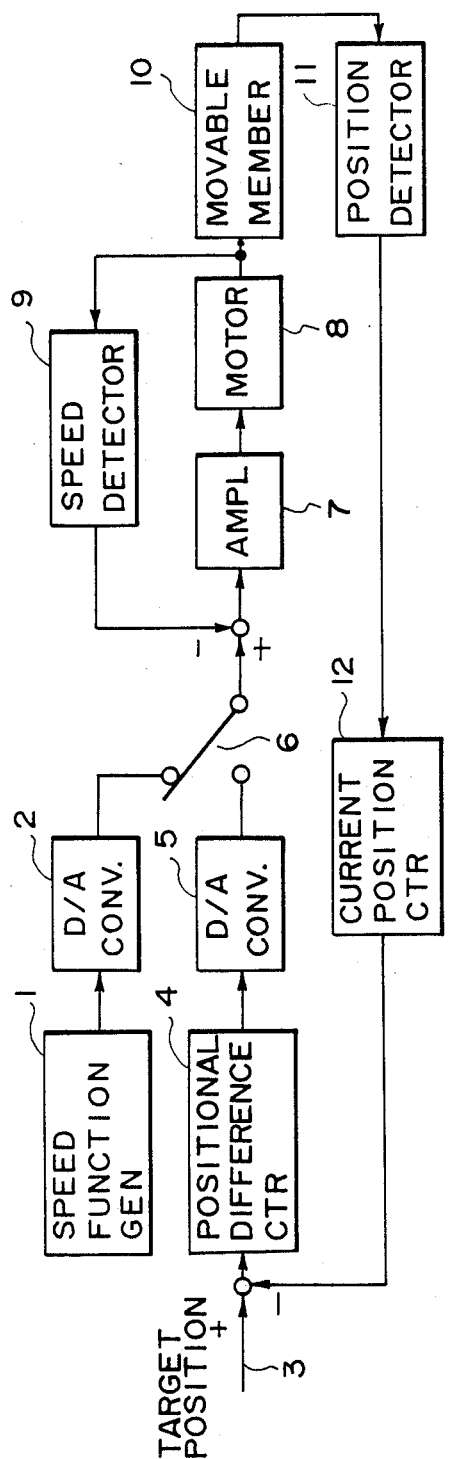
FIG. 1 is a block diagram showing an example of control system of known type positioning control device.
Figure 4:
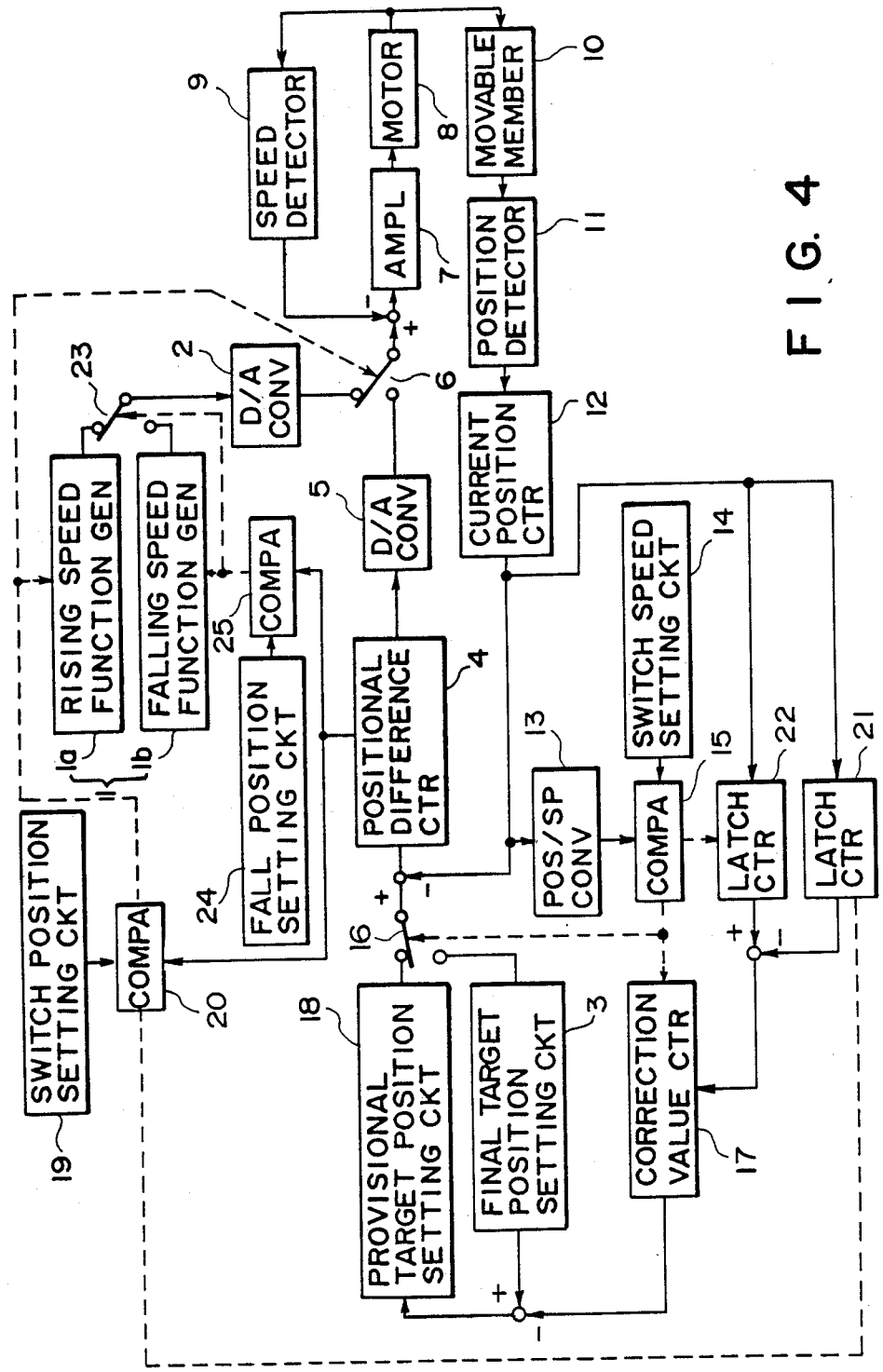
FIG. 4 is a block diagram showing the structure of a control system of the positioning control device of the first embodiment of the present invention.

Referring now to FIG. 4, there is diagrammatically shown a positioning control device according to a first embodiment of the present invention. In this embodiment, the positioning control device is incorporated into a semiconductor device manufacturing exposure apparatus of step-and-repeat type. Like numerals as of the FIG. 1 example are assigned to similar or corresponding elements.

Figure 3:
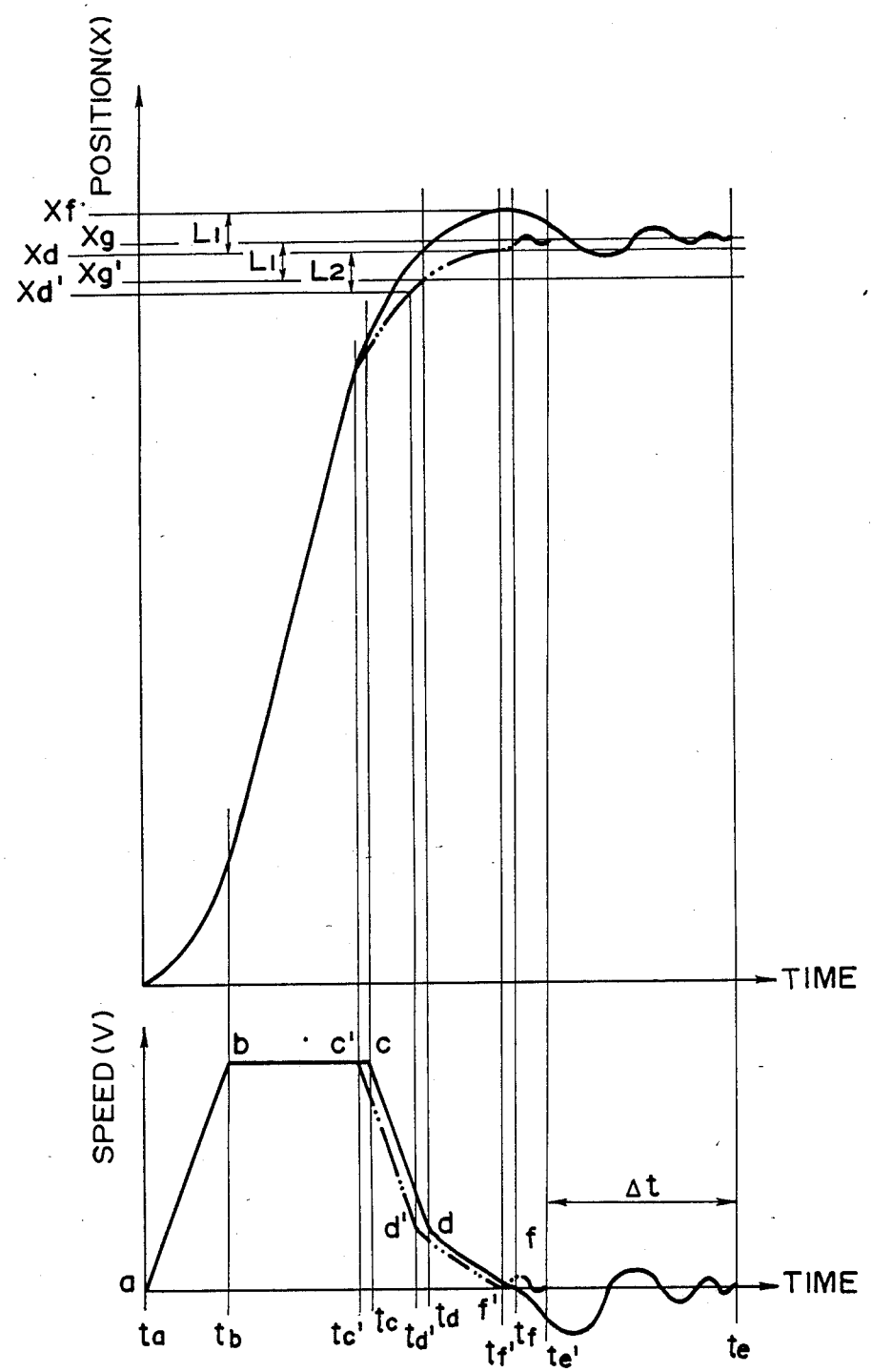
FIG. 3 is a graph showing a variable position and a variable speed of a movable member, the positioning of which is controlled by a positioning control device according to a first embodiment of the present invention.

In FIG. 4, speed function generating means denoted generally at 1 includes a rising speed function generator 1a which serves to provide a velocity profile corresponding to the period from time ta to time tc in FIG. 3, and a falling speed function generator 1b which serves to provide a velocity profile corresponding to the period from time tc to time td in FIG. 3. Signals from the speed function generating means 1 representative of the instructed velocity are converted by a digital-to-analog converter 2 (hereinafter "D/A converter") into a varying speed-instructing voltage. As illustrated in FIG. 4, the control system further includes a final target position setting circuit 3 adapted to set therein positional data concerning a final target position with respect to which a movable member 10 is to be finally positioned or stopped. In this embodiment, the movable member 10 is a slider table (wafer stage) adapted to move or feed a semiconductor wafer in a step-and-repeat manner. Positional difference counter 4 is arranged to produce an output signal corresponding to the difference (current positional difference) between the target position and the current position of the movable member 10. Digital-to-analog converter 5 (hereinafter "D/A converter") is operable to convert each output signal of the counter 4 into an electric voltage. The control system further includes an analog switch 6 which is operable to select one of the speed controlling mode and the position controlling mode. Denoted by numeral 7 is an amplifier which comprises, in this embodiment, a servo-amplifier. Denoted by numeral 8 is a motor for driving the movable member 10; by 9, a speed detector such as a tachometer generator, for detecting the driving speed of the motor 8; by 11, a position detector which may comprise a rotary encoder, a linear scale or a laser interferometer measuring system; by 12, a current position counter for storing therein the current position of the movable member 10. A position-to-speed converter 13 is arranged to detect the actual moving speed of the movable member 10 on the basis of the current position (moving distance) of the movable member 10. Switch speed setting circuit 14 is arranged to set therein a reference speed (switch speed) that is used as a reference for the moving speed of the movable member 10 in respect the switching of the target position for the movable member 10, from a temporary or provisional target position to the final target position, as will be described later in more detail. Comparator 15 is operable to compare the actual moving speed of the movable member 10 with the reference speed (switch speed) described above. Switch 16 is operable to switch the aimed position of the movable member 10, between the provisional target position and the final target position. A correction-value counter 17 is used to determine the provisional target position for the movable member 10. Setting circuit 18 is adapted to set therein positional data concerning the provisional target position. Position setting circuit 19 is arranged to set therein positional data concerning the switch position for switching the analog switch 6. More specifically, in this embodiment, positional data representing a particular positional difference is set in the setting circuit 19. Comparator 20 is arranged to compare the switch position data (the positional difference for the actuation of the switch 6) stored in the setting circuit 19 with the positional data (current positional difference) as detected by the positional difference counter 4. Latch counter 21 serves to latch a current position of the movable member 10 at a moment of the changeover of the control mode, from the speed controlling mode to the position controlling mode. Another latch counter 22 is adapted to latch the position of the movable member 10 when, after the changeover of the control mode to the position controlling mode, the speed of the movable member 10 becomes at the first time equal to the velocity data (e.g. zero speed) set in the switch speed setting circuit 14. Switch 23 is operable to switch the operation mode of the speed function generating means 1. A fall position setting circuit 24 is arranged to set therein positional data concerning a particular positional difference in regard to the initiation of deceleration. Comparator 25 is adapted to compare the positional data stored in the setting circuit 24 and the data detected by the positional difference counter 4.

At the time of initialization of the control system or when some condition such as the maximum speed, speed function or the like is changed, the correction-value counter 17 and the switch position setting circuit 19 are cleared. As for the data setting in each of the final target position setting circuit 3, the switch speed setting circuit 14 and the switch position setting circuit 19, a desired value can be set by an operator's inputting operation or in response to an instruction signal supplied from a major control unit of the exposure apparatus into which the control device of this embodiment is incorporated. Of course, the set data can be changed as desired in the same way.

First, in operation, a final target position (i.e. a finally desired stop position) is set in the final target position setting circuit 3 in accordance with the operator's inputting operation or in response to an instruction signal supplied from the major control unit. Also, a particular value is set in the correction-value counter 17. In the present example, "0 (zero)" is set in the counter 17. In response, accordingly, the same numerical data as that set in the final target position setting circuit 3, in this case, is stored in the provisional target position setting circuit 18. Further, the switch 6 is actuated to select the D/A converter 2, while the switch 16 is actuated to select the provisional target position setting circuit 18. Additionally, the switch 23 is actuated to select the rising speed function generator 1a. Thus, the speed control can be initiated in response to the triggering of the rising speed function generator 1a.

Figure 2:
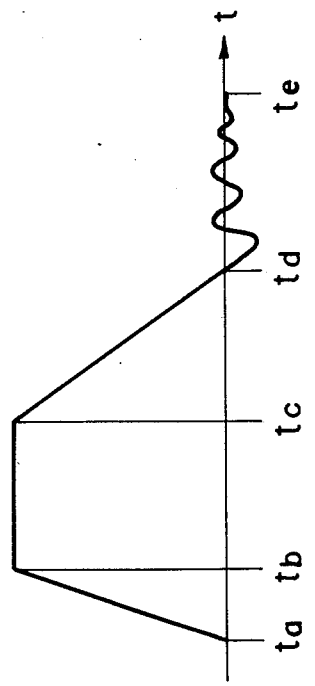
FIG. 2 is a graph showing a velocity profile set by the control system of FIG. 1.

In the speed controlling mode, the motor 8 is first driven in accordance with a velocity profile instructed by the rising speed function generator 1a. As the movable member 10 moves in accordance with the driving of the motor 8, the value in the counter 4 representing the difference between the target position and the current position of the movable member 10 decreases. When the value in the counter 4 becomes equal to the value set in the fall position setting circuit 24, the comparator 25 produces a trigger signal. In response, the switch 23 is actuated to select the falling speed function generator 1b in place of the rising speed function generator 1a, such that the falling speed function generator 1b produces instruction signals corresponding to a decelerating velocity profile in the period from time tc to time td in FIG. 3. By the above-described operation, the movable member 10 is moved in accordance with the velocity profile between time ta and time td in FIG. 2.

At time td at which the value in the counter 4 becomes equal to the value set in the switch position setting circuit 19, the comparator 20 produces a trigger signal. In response, the analog switch 6 is turned to select the D/A converter 5, whereby the position controlling mode is established in substitution for the speed controlling mode. At the same time, the current position of the movable member 10 (i.e. the position Xd in FIG. 3) is stored in the latch counter 21.

After the changeover to the position controlling mode, the movable member 10 overruns the target position (desired stop position) Xg in FIG. 3 due to the inertia of the movable member 10. The moving speed of the movable member 10, after it passes the target position Xg, is monitored by the position/speed converter 13. Also, the moving speed of the movable member 10 is compared with the speed data set in the switch speed setting circuit 14. In this particular example, "zero speed" has been set in the setting circuit 14. When the moving speed of the movable member 10 becomes equal to the speed data stored in the setting circuit 14, i.e. at time tf in FIG. 3, a trigger signal is outputted from the comparator 15. In response to this trigger signal, the current position of the movable member 10 (i.e. the position Xf in this example) is stored into the latch counter 22. At the same time, the difference or interval (L1) between the position Xd at time td as stored in the latch counter 1 and the position Xf at time tf as stored in the latch counter 22, is stored into the correction-value counter 17. Also, at the same time, the switch 16 is actuated to select the final target position setting circuit 3. At time te, the first-time positioning is completed, as seen from FIG. 3.

The second-time positioning is executed in the following manner. In step-and-repeat type exposure apparatus, as is well known in the art, the moving distance between adjacent shot areas on the wafer (i.e. the amount of movement of a wafer stage necessary for step-feeding the wafer from its current-shot-area exposing position to the next-shot-area exposing position) is substantially constant. For the second-time positioning for bringing the next or second shot area to the exposure position, a final target position (desired stop position) regarding the second shot area of the wafer is set in the final target position setting circuit 3. Also, the difference between the desired moving distance with respect to the final target position for the second shot area, as stored in the setting circuit 3, and the correction value L1 as stored in the correction-value counter 17 as a result of the first-time positioning, is set in the provisional target position setting circuit 18. In other words, the data corresponding to the provisional target position Xg' (=Xg−L1) as depicted in FIG. 3 is set in the provisional target position setting circuit 18.

During the speed controlling mode, the movable member 10 is moved in the same manner as that of the first-time positioning. It is to be noted however that, in the case of the second-time positioning, the position Xg' in FIG. 3 is set as the provisional target position as compared with the case of the first-time positioning wherein the position Xg is initially set as the provisional target position. Accordingly, the position and the moving speed of the movable member 10 change in the manner as depicted by dash-and-dot lines in FIG. 3. That is, at each of the points a, b, c' and d', the phase of movement of the movable member 10 changes.

At time td', the speed-controlling mode is charged to the position controlling mode. In response, the position of the movable member 10 at time td' is stored into the latch counter 21, as in the case of the first-time positioning. Because of the inertia, the movable member 10 passes the provisional target position Xg'. After the movable member 10 reaches the provisional target position, the moving speed of the movable member 10 is monitored by the speed detecting converter 13. When the moving speed of the movable member 10 becomes equal to the speed data stored in the setting circuit 14, the comparator 15 produces a trigger signal. In response to this trigger signal, as in the case of the first-time positioning, the switch 16 is actuated to select the final target position setting circuit 3. At the same time, the current position of the movable member 10 is stored into the latch counter 22. Also, a renewing correction value (i.e. the difference between the positional data stored in the latch counter 22 and the positional data stored in the latch counter 21) is stored into the correction-value counter 17. At this time, the movable member 10 is at a position close to the final target position. Also, the moving speed of the movable member 10 is "zero". Therefore, the time for completing the positioning can be reduced significantly. By repeating the above-described operation of the positioning control, the correction value is gradually converged such that the positioning can be completed at time close to time tf'. The manner of determination of the correction value and the effect of reduction in time 5 resulting therefrom will be described later in more detail.

While the foregoing description has been made with reference to a case where the movable member is repeatedly moved by a constant distance, the concept of the positioning control according to the present invention is applicable also to a case where the movable member is to be moved by a varying distance. That is, any change in the distance through which the movable member is to be moved, can be easily met only by changing the time period for which the movable member is moved at a constant maximum speed. A correction value determined in a particular positioning operation can be used in the succeeding positioning operation irrespective of the variation in the moving distance.

Another embodiment of the present invention will now be described, taken in conjunction with FIG. 5.

Figure 5:
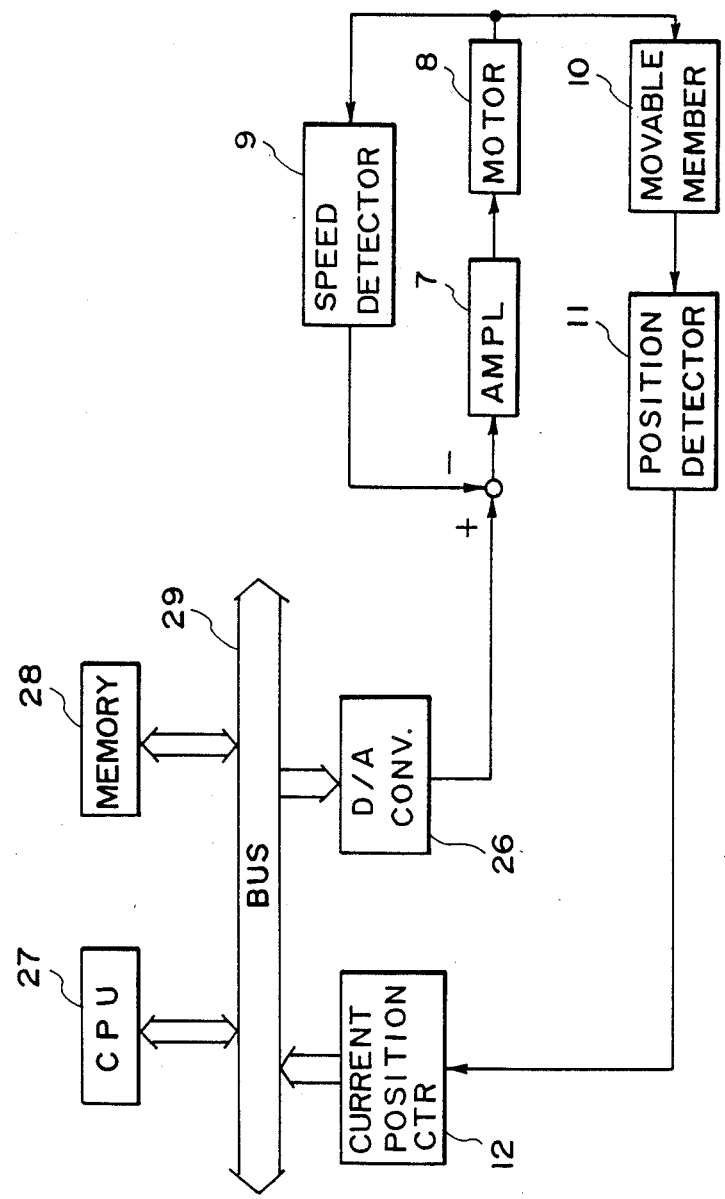
FIG. 5 is a block diagram showing a control system of a positioning control device according to a second embodiment of the present invention.
Figure 6:
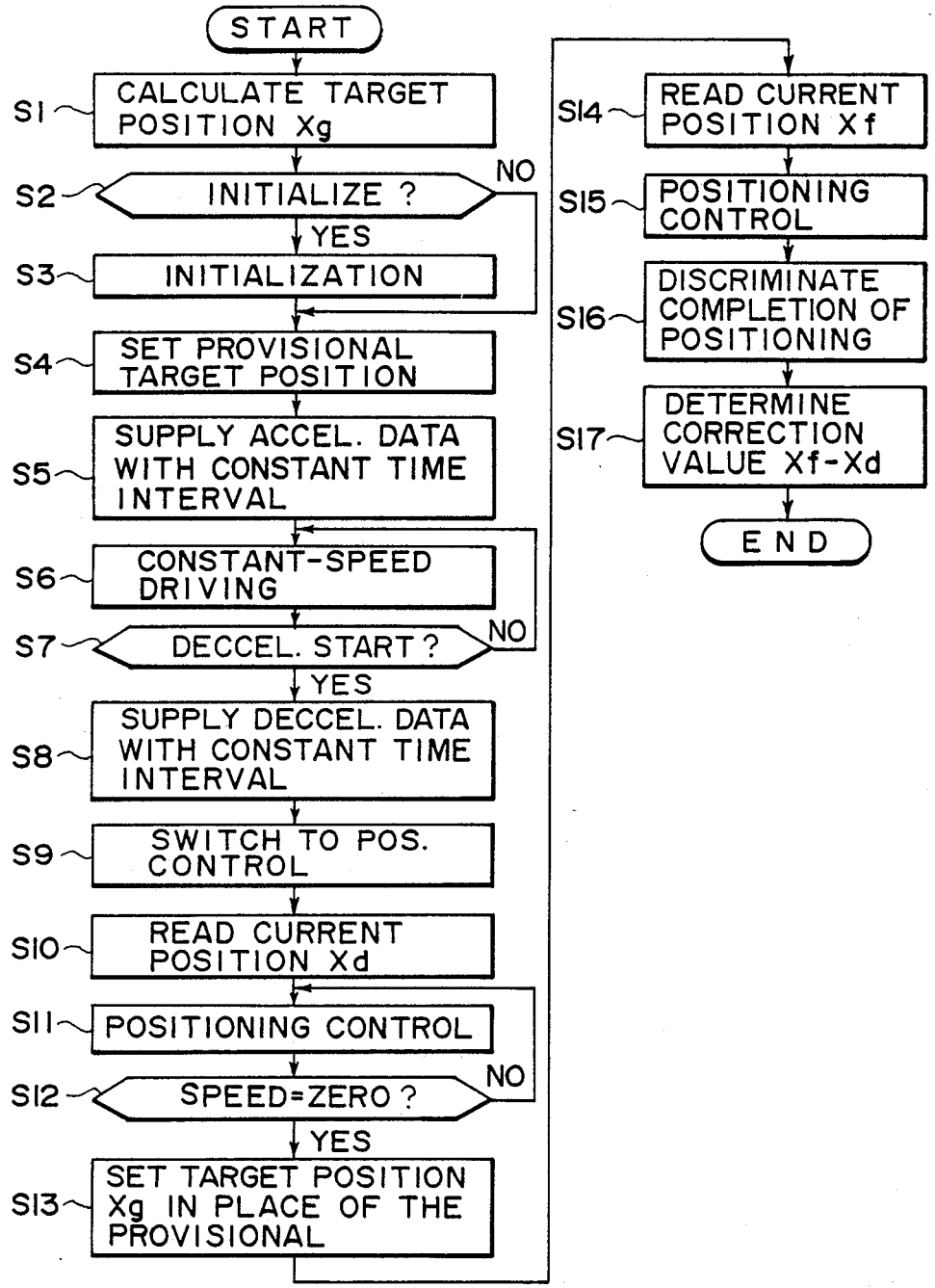
FIG. 6 is a flow chart showing algorithm of the operation of the FIG. 5 device.

As shown in FIG. 5, the control system of the present embodiment comprises a central processing unit 27 (hereinafter "CPU") such as a microcomputer or minicomputer, a memory device 28 such as a read only memory (ROM) or a random access memory (RAM), a bus 29 for the computer, and a digital-to-analog converter 26 (hereinafter "D/A converger"). In the present embodiment, the functions of the blocks 1, 3, 4 and 13-25 of the FIG. 4 embodiment are provided by the software of the computer. Like numerals as of the FIG. 4 embodiment are assigned to similar or corresponding elements. The operation and function of the control system of the FIG. 5 embodiment will now be described, while referring to the flow chart of FIG. 6.

At the initial stage of the positioning operation, the CPU 27 executes calculations concerning the target position Xg (Step S1). The target position is a point at which the movable member 10 should be finally positioned, and corresponds to the sum of the current position and the moving distance.

For the first-time positioning after start of the apparatus or at the time of reset of conditions, the sequence goes to Step S2 and to Step S3, whereby initialization is executed. By this initialization, the correction value as has been described with reference to the counter 17 in the FIG. 4 embodiment is cleared, so that a value "zero" is set as the correction value. Also, a predetermined value is set as the positional difference for the deceleration start, as has been described with reference to the setting circuit 24 in the FIG. 4 embodiment.

Subsequently, at Step S4, the CPU 27 calculates the provisional target position. The provisional target position is determined by subtracting the correction value from the final target position Xg. In the present embodiment as in the FIG. 4 embodiment, the provisional target position for the first-time positioning is coincident with the final target position Xg.

Subsequently, the CPU 27 signals an acceleration speed-function to the D/A converter 26 at a predetermined constant time interval (Step S5) whereby the movable member 10 is moved with an increasing speed until a predetermined maximum speed is reached. When the moving speed of the movable member 10 reaches the instructed maximum speed, then the movable member 10 is moved at the constant maximum speed (Step S6) until the movable member 10 reaches the deceleration start position. Whether or not the movable member 10 reaches the deceleration start position is discriminated by detecting the current position of the movable member 10 with the aid of the current position counter 12, by calculating the difference between the current position and the provisional target position by means of the CPU 27, and by comparing the positional difference, as calculated, with the predetermined value which has been set as the positional difference for the deceleration start position. This discrimination is repeated (Step S6 and S7).

When the result of comparison shows that the positional difference, as calculated, is equal to or smaller than the predetermined positional difference for the fall position (deceleration start position), it is discriminated that the movable member 10 has reached the deceleration start position. Therefore, the sequence goes to Step S8 so that deceleration data is outputted to the D/A converter 26 at a predetermined constant time interval. When all the deceleration data is outputted to the converter 26, the control mode is changed so that the position controlling mode is established. At the same time, the value "Xd" in the current position counter 12 is stored into the memory 28 (Steps S9 and S10).

Subsequently, the current position of the movable member 10 which is moving is sampled by use of the current position counter 12 and the CPU 27. While continuing the sampling of the current position of the movable member 10, a current position X1 of the movable member 10 sampled at a particular timing is compared with a position X2 of the movable member 10 detected by the current position counter 12 at the preceding sampling operation. This comparison is repeated until a relation "X1−X2≦0" is satisfied (Steps S11 and S12).

When the relation "X1−X2≦0" is satisfied, the aimed position of the moving member 10 is changed. That is, the final target position Xg is introduced in place of the provisional target position (Step S13). Also, the current position Xf of the movable member 10 at that time is read and stored into the memory (Step S14). Thereafter, the position control is continued (Step S15).

After the positioning is completed (Step S16), the correction value L1=(Xf−Xd) is calculated by the CPU 27 (Step S17). By this, the positioning operation is finished.

For the second-time positioning, the CPU 27 effects calculations concerning the target position Xg with respect to the second shot area on the wafer (Step S1). Since in this case, the initialization should not be executed, Step S3 is skipped so that the sequence goes directly to Step S4 from Step S2. At Step S4, the provisional target position Xg' is calculated in accordance with an equation "Xg'=Xg−L1". The subsequent operation from Step S5 to Step S10 is essentially the same as that made in the corresponding Steps for the first-time positioning operation, except for that the control mode is changed when the movable member 10 reaches at the position Xd' (=Xd−L1). This is because the position Xg' is set as the provisional target position for the second-time positioning. At time tf', the moving speed of the movable member 10 becomes equal to the preset speed which is "zero speed" in this embodiment, so that the final target position Xg is introduced in place of the provisional target position Xg'. As will be seen from FIG. 3, the current position (Xf') of the movable member 10 at time tf' is equal to or substantially equal to the position Xd. The positioning operation is continued at Steps S15 and S16. Finally, at Step S17, the renewing correction value L2, which is to be used in the third-time positioning, is calculated by means of the CPU 27 in accordance with the following equation:

$$L2=(Xf'-Xd')=(Xd-Xd')$$

By this, the second-time positioning operation is finished. As will be seen from FIG. 3, the second-time positioning operation is completed at time te', as contrasted to te first-time positioning operation which were completed at time te. As a result, the time necessary for the positioning is reduced by an amount $\Delta t=(te-te')$.

As in the first embodiment, the correction value in the second embodiment can be gradually converged with the repetition of the positioning operation.

In accordance with the first and second embodiments, as described hereinbefore, the amount of movement of the movable member 10 from the control mode changing position (e.g. L1=Xf−Xd in the first-time positioning operation) is used as the correction value for the subsequent positioning operation (e.g. the second-time positioning operation). More particularly, on the basis of the correction value, a provisional target position is determined. By doing so, the amount of undesirable overrun of the movable member from the desired stop position due to the inertia of the movable member can be reduced or avoided. Therefore, the time necessary for the positioning can be reduced significantly, without adversely offsetting the positioning accuracy.

Figure 7:
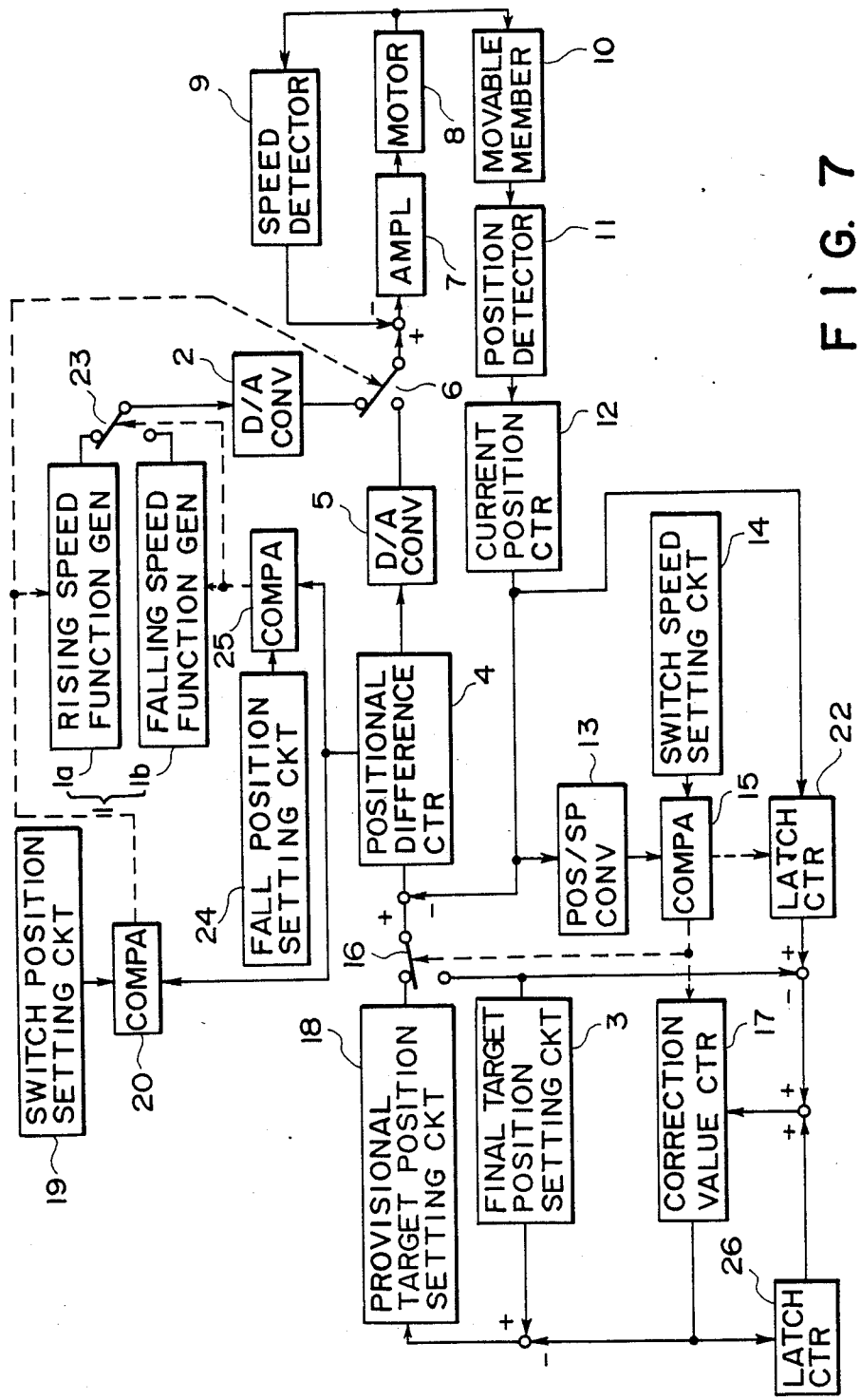
FIG. 7 is a view similar to FIG. 4 but showing a control system of a positioning control device according to a third embodiment of the present invention.

Referring now to FIG. 7, description will be made of a third embodiment of the present invention.

The third embodiment shown in FIG. 7 is similar to the first embodiment shown in FIG. 4. In the FIG. 7 embodiment, the latch counter 21 of the FIG. 4 embodiment is omitted and, in place thereof, a latch counter 26 is added. Also, the manner of determination of the correction value in the present embodiment is different from that in the FIG. 4 embodiment. Except for these points, the structure and function of the control system of the present embodiment are the same as those in the FIG. 4 embodiment. For this reason, in regard to the present embodiment, description will be made only to the manner of determination of the correction value in the interest of simplicity.

For the first-time positioning operation, the control system is initialized. That is, the correction-value counter 17 as well as the latch counter 26 are cleared. The movable member 10 starts movement at time ta and reaches the position Xd at time td. In response, the control mode is changed so that the position controlling mode is established in place of the speed controlling mode. After this mode changeover, the moving speed of the movable member 10 first becomes equal to "zero", at time tf. The current position Xf of the movable member 10 at time tf is latched by the latch counter 22. Thereafter, the movable member 10 is positioned in essentially the same manner as that in the FIG. 4 embodiment.

In the present embodiment, the correction value to be used in the second-time positioning is determined by adding, to the positional difference data stored in the latch counter 26, the difference between the final target position Xg and the position Xf as stored in the latch counter 22. For the first-time positioning, the correction value was "zero". Accordingly, in the present embodiment, the correction value for the second-time positioning can be given by:

$$L1=(Xf-Xg)$$

Namely, in the present embodiment, such position that is short of (or beyond) the final target position by a distance corresponding to the amount of overrun (or undershooting) of the movable member from (or to) the final target position, in the positioning operation just having been completed, is used to determine the provisional target position (Xg') for the subsequent positioning operation. The correction value so determined is set in the correction-value counter 17.

It will be understood from the foregoing that, according to the present embodiment, the second-time positioning can be completed in a further reduced time. That is, where the position of the movable member 10, at a moment during the second-time positioning operation when the moving speed of the movable member 10 becomes first equal to "zero" after the position controlling mode is established, is denoted by Xf', the position Xf' is closer to the final target position Xg, as compared with the corresponding position Xf' defined by the second-time positioning operation according to the FIG. 4 embodiment. As a result, in accordance with the present embodiment, the effect of reduction in the positioning time by the amount Δt (FIG. 3) according to the FIG. 4 embodiment can be improved significantly.

It will be understood from the foregoing that, at the final stage of the second-time positioning operation, the correction value L2 to be used in the third-time positioning is determined in accordance with the following equation:

$$L2=L1+(Xf'-Xg)$$

By repeating the above-described positioning control, the correction value is gradually decreased such that the positioning of the movable member will be completed at time which is very close to time tf' at which the moving speed of the movable member becomes equal to zero, at the first time, in a particular positioning operation.

In the foregoing, the invention has been described with reference to specific embodiments wherein constant positional difference data is used for the fall position (deceleration start position) in regard to each of different target positions (the positions of the shot areas on the wafer). Also, a series of positioning operations with respect to a set of target positions, for moving the wafer in the step-and-repeat manner, are carried out by repeatedly renewing the correction value. However, the invention is not limited to these embodiments. As an example, for the fall position and/or the correction value, different and individual positional difference data may be prepared in connection with the different target positions, respectively, so that a suitable one of them can be selected as a function of the target position desired. Further, it is a possible alternative that the entire movable range of the movable member 10 is divided into plural moving blocks each having an individual correction value. Namely, for the repetition of movement of the movable member 10 in a particular moving block, the provisional target position is determined in accordance with the history of movement of the movable member 10 in that particular moving block. In other words, for the step-and-repeat movement of a wafer stage in a step-and-repeat type exposure apparatus, for example, the movable range of the wafer stage in a particular direction may be divided into plural moving blocks and, for each moving block, initialization and determination of the correction value as well as the renewing of the correction value can be executed independently of the other moving block or blocks.

While the invention has been described with reference to the structures disclosed herein, it is not confined to the details set forth and this application is intended to cover such modifications or changes as many come within the purposes of the improvements or the scope of the following claims

What is claimed is:

1. A device for controlling the position of a movable member, comprising:
   driving means for moving the movable member;
   position detecting means for detecting current position data related to a current position of the movable member;
   speed detecting means for detecting current moving speed data related to a current moving speed of the movable member;
   speed instruction producing means for producing speed instruction data related to a moving speed of the movable member;
   speed controlling means for controlling said driving means in accordance with the speed instruction data;

position controlling means for controlling, after said driving means is controlled by said speed controlling means, said driving means for a first period on the basis of any difference between provisional target position data and the current position data and for a second period, after the current moving speed data becomes equal to a set moving speed, on the basis of any difference between final target position data and the current position data; and correcting means operable to store, as correction data, the current position data at a time, after said driving means is controlled by said speed controlling means, when the current moving speed data becomes equal to the set moving speed wherein the correction data is used to correct the provisional target position data.

2. A device according to claim 1, wherein the set moving speed is zero.

3. A device according to claim 1, wherein the provisional target position data is corrected on the basis of any difference between the final target position data and the correction data.

4. A device according to claim 1, wherein said speed controlling means controls said driving means in accordance with the speed instruction data until the difference between the provisional target position data and the current position data reaches a predetermined value.

5. A device for controlling the position of a movable member, comprising:

driving means for moving the movable member;

speed controlling means for controlling said driving means in accordance with a speed instruction related to the moving speed of the movable member; and position controlling means for controlling, after said driving means is controlled by said speed controlling means, said driving means for a first period so that the movable member is positioned at a provisional target position and for a second period, after the moving speed of the movable member becomes, for a first time, equal to zero, so that the movable member is positioned at a final target position, wherein the provisional target position is selected so that for the first time, after said driving means is controlled by said speed controlling means, the moving speed of the movable member becomes equal to zero as the movable member comes very close to the final target position.

6. A device according to claim 5, wherein said speed controlling means controls said driving means so that the moving speed of the movable member converges toward the provisional target position.

7. A method of controlling the position of a movable member, comprising the steps of:

controlling a driving means for moving the movable member in accordance with speed instruction data related to a moving speed of the movable member;

after the driving means is controlled in accordance with the speed instruction data, controlling the driving means on the basis of any difference between provisional target position data and current position data related to the current position of the movable member;

after the driving means is controlled in accordance with the speed instruction data and after current moving speed data related to the current moving speed of the movable member becomes equal to a set moving speed, controlling the driving means on the basis of any difference between final target position data and the current position data; and storing, for correction of the provisional target position data, the current position data at a time, after the driving means is controlled in accordance with the speed instruction data, when the current moving speed data becomes equal to the set moving speed.

8. A method of controlling the position of a movable member, comprising the steps of:

controlling a driving means for moving the movable member in accordance with speed instruction data related to a moving speed of the movable member;

after the driving means is controlled in accordance with the speed instruction data, controlling the driving means on the basis of any difference between provisional target position data and current position data related to a current position of the movable member;

after the driving means is controlled in accordance with the speed instruction data and after current moving speed data related to the current moving speed of the member becomes, for a first time, equal to a set moving speed, controlling he driving means on the basis of any difference between final target position data and the current position data; and storing, for correction of the provisional target position data, the current position data at a time, after the driving means is controlled in accordance with the speed instruction data, when the current moving speed data becomes, for the first time, equal to the set moving speed.

* * * * *

UNITED STATES PATENT AND TRADEMARK OFFICE
CERTIFICATE OF CORRECTION

PATENT NO. : 4,888,536

DATED : December 19, 1989

INVENTOR(S) : TOSHIKAZU SAKAI ET AL.

Page 1 of 2

It is certified that error appears in the above-identified patent and that said Letters Patent is hereby corrected as shown below: On the title page:

AT [56] REFERENCES CITED

U.S. Patent Documents, "Duvall" should read --DuVall--.

COLUMN 3

Line 42, "{cur-" should read --(cur---.
    Line 65, "respect" should read --respect to--.

COLUMN 6

Line 46, "5" should be deleted.

COLUMN 7

Line 1, ""D/A converger")." should read
    --"D/A converter").--.

COLUMN 8

Line 51, "te first-time" should read
    --the first time--, and
    "were" should read --was--.

COLUMN 9

Line 15, "value" should read --value,--.

COLUMN 10

Line 10, "at time" should read --at a time--.
    Line 49, "many" should read --may--.
    Line 51, "claims" should read --claims.--.

UNITED STATES PATENT AND TRADEMARK OFFICE
CERTIFICATE OF CORRECTION

PATENT NO. : 4,888,536

DATED : December 19, 1989

INVENTOR(S) : TOSHIKAZU SAKAI ET AL.

Page 2 of 2

It is certified that error appears in the above-identified patent and that said Letters Patent is hereby corrected as shown below:

COLUMN 12

Line 42, "he" should read --the--.

Signed and Sealed this

Sixteenth Day of July, 1991

Attest:

HARRY F. MANBECK, JR.

Attesting Officer

Commissioner of Patents and Trademarks